United States Patent [19]

Baker

[11] Patent Number: 4,615,363

[45] Date of Patent: Oct. 7, 1986

[54] FILLING AND WEIGHING MACHINE

[75] Inventor: William G. Baker, Palm Beach, Australia

[73] Assignee: Design Engineering Pty. Limited, Brookvale, Australia

[21] Appl. No.: 676,057

[22] Filed: Nov. 29, 1984

Related U.S. Application Data

[63] Continuation-in-part of Ser. No. 410,163, Aug. 20, 1982, abandoned.

[30] Foreign Application Priority Data

Aug. 31, 1981 [AU] Australia .............................. PF0497

[51] Int. Cl.⁴ .............................................. B65B 1/06
[52] U.S. Cl. .................................... 141/193; 141/248
[58] Field of Search ................. 141/83, 248, 192, 193, 141/195; 177/89, 90, 91, 92, 93, 99

[56] References Cited

U.S. PATENT DOCUMENTS

| 321,793 | 7/1885 | Campbell | 177/91 X |
| 1,025,781 | 5/1912 | Broussard | 141/248 X |
| 1,081,742 | 1/1913 | Hochenauer | 141/193 |
| 2,699,891 | 1/1955 | Kellicott | 141/248 X |

Primary Examiner—Stephen Marcus
Assistant Examiner—Mark Thronson
Attorney, Agent, or Firm—Ladas & Parry

[57] ABSTRACT

An apparatus for dispensing predetermined weights of material into containers. The apparatus includes a pair of pivotable support members, a feeding chute, and two flexible lines. In operation, when one of the containers is filled, the feeding chute is pivotably directed to another container.

7 Claims, 3 Drawing Figures

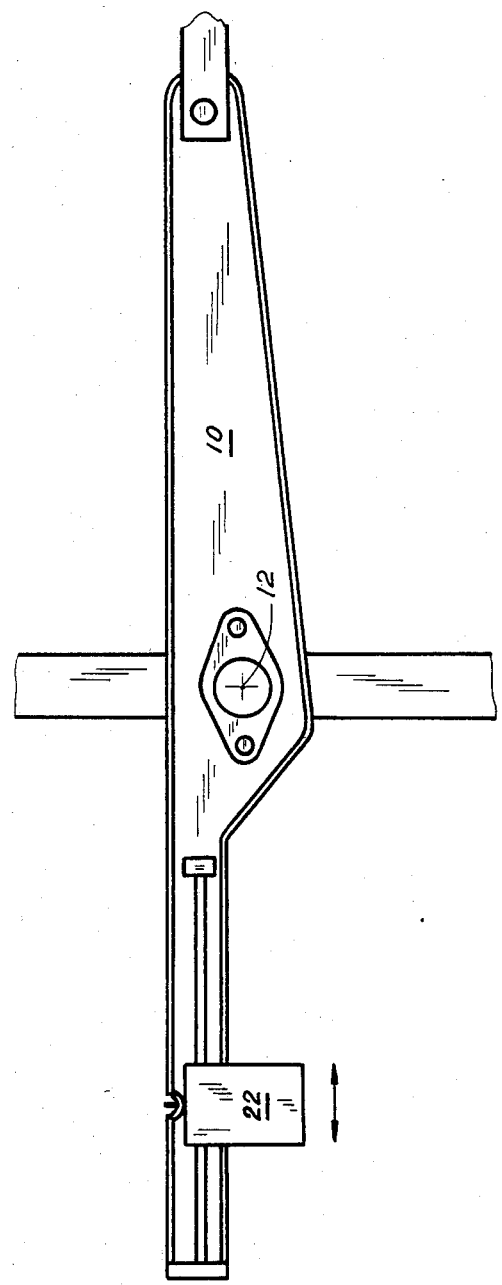

FILLING AND WEIGHING MACHINE

This is a continuation-in-part application of U.S. patent application Ser. No. 410,163 filed Aug. 20, 1982 which is now abandoned.

The present invention relates to a filling and weighing machine. In particular, the invention is directed to apparatus for dispensing predetermined weights of material into containers.

The use of automatic filling and weighing machines was popularized in the grain industry around the turn of the century. Today, they are still used extensively in agricultural and industrial fields, particularly packaging.

Known filling machines generally comprise a pair of spouts adapted to dispense material into respective containers, and feeding means for varying the flow of material from one spout to the other, such feeding means being automatically actuated when the weight of material in the container being filled reaches a predetermined value. The feeding means can comprise a pivotable chute as disclosed in U.S. Pat. Nos. 321,209 and 364,407, or a deflection plate as disclosed in U.S. Pat. Nos. 293,129; 302,697, 321,793 and 669,607. A disadvantage of these known devices is that the flow of material impinges on the chute or deflection plate in such a manner as to oppose the movement of the chute or plate to alternate the flow of the material between spouts. Thus, a greater force is required to effect the changeover, and inaccuracies in the weights of the dispensed material may occur as a consequence, particularly for weights less than a few kilograms.

Australian Pat. No. 485,455 discloses a filling machine having two pivotable platforms, one end of each platform being adapted to support a container to be filled, while the other end of each platform supports a predetermined weight. Mechanical means are provided to divert the chute from one container to the other when the one container has been filled to the set weight. As in the above referenced U.S. patents, the means for diverting the chute from one container to the other in the machine disclosed in U.S. Pat. No. 485,455 comprises a complex arrangement of connecting rods, push rods, pivoting levers and bevel gears. When the container at one end of one of the pivotable platforms is filled to the predetermined weight, that end of the platform sinks thereby causing the other end to rise. The other end of that platform has a connecting rod attached thereto which, as it rises, pushes against a stop on a push rod. The push rod, in turn, causes a rocker bar to pivot about a horizontal axis. By means of a bevel gear, the rotation of the rocker arm about a horizontal axis is transformed into rotation of a shaft about a horizontal axis. The shaft is connected to the material feeding chute which is thereby rotated about a vertical axis from the filled container to the container to be filled.

The above described complex system of linkages and gears gives rise to a high degree of friction and inertia in the means for diverting the material feeding chute. As a result, the known apparatus is not entirely suitable for filling containers to weights less than 5 kilograms, since it becomes inaccurate and the weight of a filled container may not be sufficient to actuate the means for diverting the chute to the unfilled container.

Furthermore, the complex linkage arrangement gives rise to a relatively high construction and retail costs.

U.S. Pat. No. 2,699,891 discloses a bagging apparatus having an electrically operated chute which directs a flow of material to one of two containers mounted on respective pivotable platforms. When the weight in a container reaches a predetermined value, its platform pivots thereby actuating a switch to energize one of a pair of solenoids to electrically direct the feed chute to the other container. The material passing through the inlet duct impinges against a side of the feed chute thereby producing a turning moment about the shaft of the feed chute. This may not affect the accuracy of the prior art device since the pivoting of the feed chute is controlled by electromechanical means. However, the use of such electromechanical means is a weighing device introduces disadvantages such as increased complexity of design, increased cost of manufacture and maintenance and, more importantly, the requirement of a power source. Since such weighing machines are often used in remote locations where power is not available, e.g. in outlying sheds on farms, non-electrically operated devices are far more attractive.

It is an object of the present invention to overcome or substantially ameliorate the abovedescribed disadvantages by providing apparatus for dispensing predetermined quantities of material into containers, said apparatus comprising uncomplicated, but effective, means for diverting the material from one container to the other.

According to the present invention, there is disclosed an apparatus for dispensing predetermined weights of material into containers, said apparatus comprising:

A pair of pivotable support members, one end of each support member providing a support for a respective container to be filled, the other end of each support member providing a predetermined counterweight to determine the weight of material to be dispensed into said respective container, each said support member being pivotable about an axis between its ends;

a material feeding chute pivotable about an axis and adapted to dispense material alternately into each said container in such a manner that a material flow, entering said feeding chute impinges on a face of said chute so as to produce no substantial turning moment about the pivot axis of the chute; and means for directing said feeding chute from one container to the other when said one container is filled to the predetermined weight;

said means for directing said feeding chute having a directing member connected to said chute and pivotable about an axis between its ends, two flexible lines, each connected between a respective one of said support members and a respective end of said directing member, said directing member being counterweighted so that its center of gravity passes from one side of its pivoting axis to the other during pivoting;

whereby each said flexible line causes said directing member to pivot in response to movement of the corresponding support member in one direction when the respective container is filled to the predetermined weight to thereby direct said feeding chute to the other container.

Preferably, said flexible lines are chain or string.

Preferably, the directing member is connected directly to the feeding chute and both are pivotal about the same axis so that said lines provide a direct response between movement of said support members and pivoting of said feeding chute. Since, there are no complex linkage arrangements between the support members and the feeding chute, friction and inertia are reduced to a minimum thereby allowing small weights to be dispensed.

Preferably, the directing member is counterweighted so that its centre of gravity passes from one side of the pivoting axis to the other during pivoting. The directing member is designed so that the initial pivotal movement of a supporting member is sufficient to transfer the centre of weight from one side to the other. Thereafter, the directing member continues to pivot to a rest position under its own counterweight. The counterweight biases the directing member in a rest position on one side until the line on the opposite side exerts a sufficient force to pivot the directing member and transfer the centre of gravity to the other side of the pivot axis.

Notwithstanding any other forms that may fall within its scope, a preferred form of the present invention will now be described by way of example with reference to the accompanying drawings in which:

FIG. 3 is a schematic side elevational partial view of the filling machine of FIG. 1, showing operation thereof.

Figure 1:
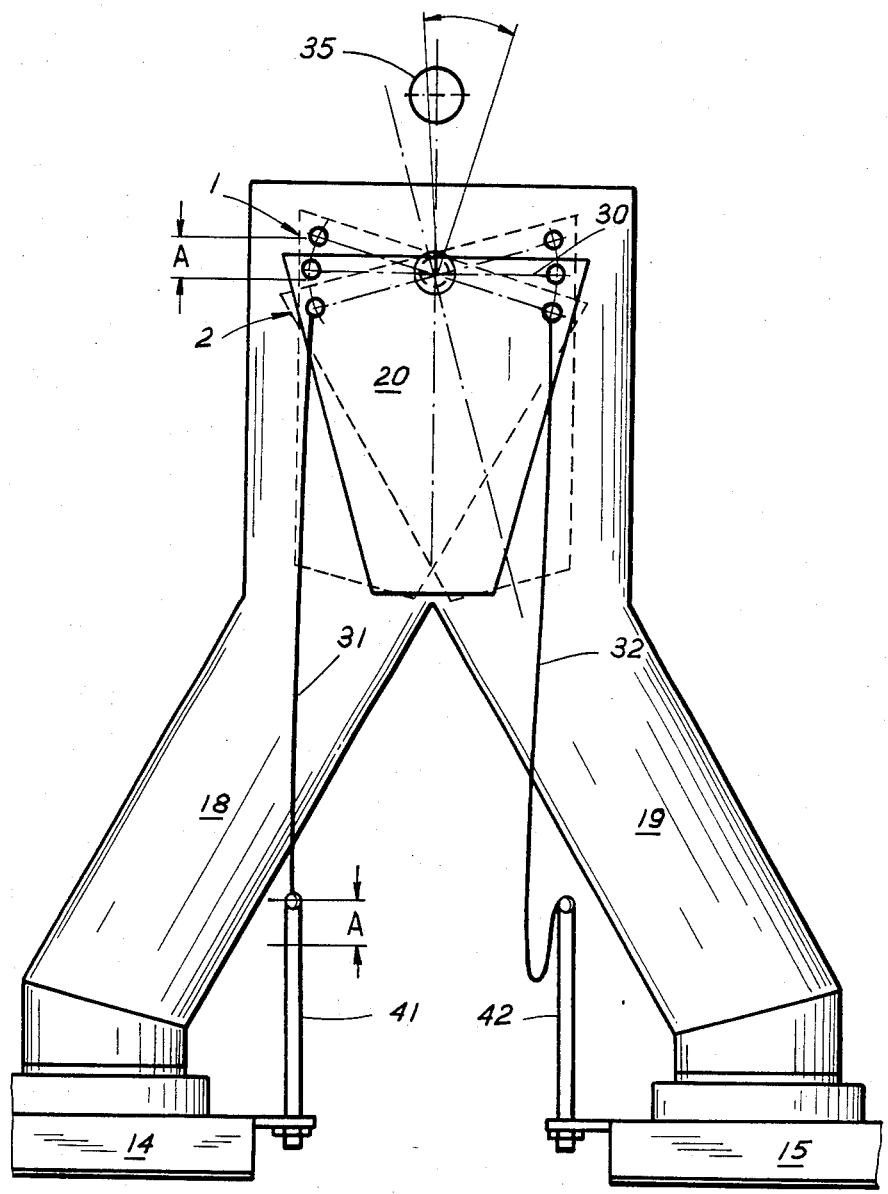
FIG. 1 is a schematic front elevational view of a filling machine according to the preferred embodiment of the present invention.

The filling machine of the preferred embodiment comprises two pivotable support members, such as scale beams 10 and 11. For simplicity, FIG. 3 shows only scale beam 10 in detail, scale beam 11 being identical in construction. The scale beam 10 is pivotable about an axis at pivot point 12. Attached to one end of the scale beam 10, there is provided a support 21 for a container (not shown) to be filled. At the opposite end of the scale beam 10, there is provided a weight 22 whose position along the scale beam can be changed to vary the effective counterweight provided to the support 21.

Figure 2:
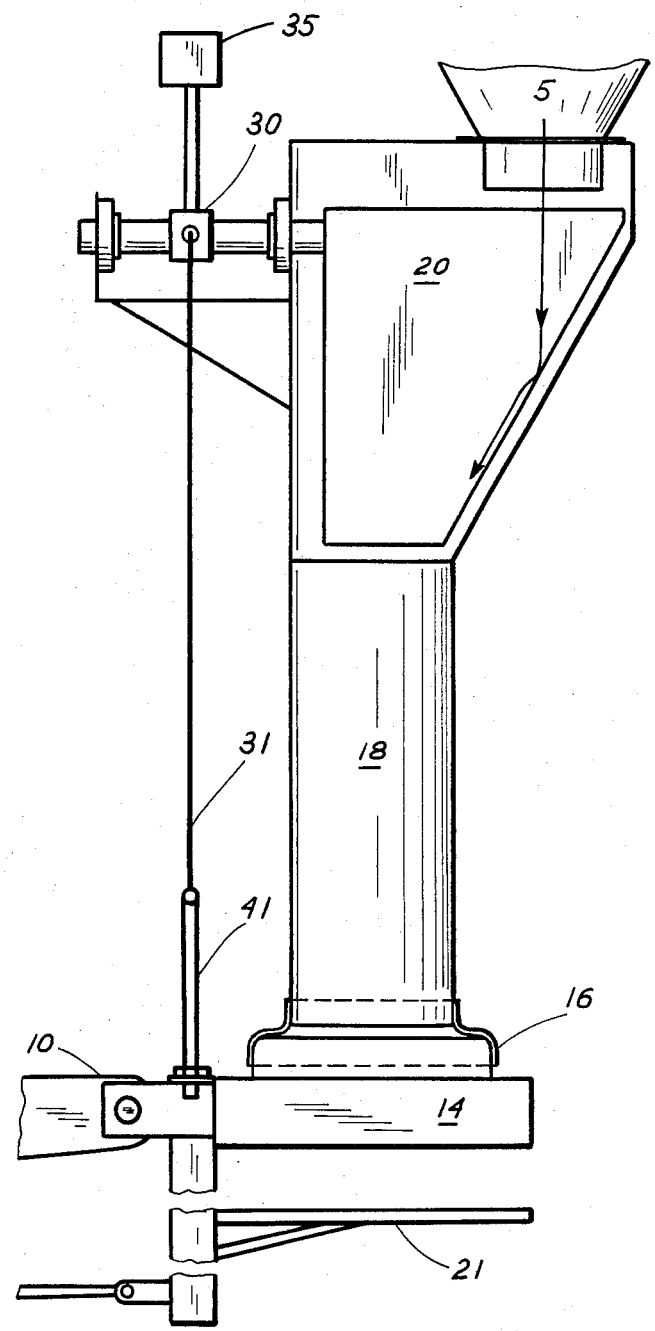
FIG. 2 is a schematic side elevational partial view of the filling machine of FIG. 1.

The container to be supported by support 21 is filled with material via feeding chute 20 which co-operates with a baffle arrangement which defines two outlets leading into connecting chutes 18, 19. As illustrated in FIG. 2, material passing into the feeding chute 20 impinges on the front sloping side preferably in the same vertical plane as the axis about which chute 20 pivots. Since the material flow does not impinge against a side wall of the chute 20, there is no substantial turning moment created by the material hitting the chute 20. Further, material flow does not hinder the pivoting of the chute 20 from side-to-side. Increased accuracy is achieved thereby allowing the machine to be used for dispensing weights as low as 500 grams. Preferably, the connecting chutes 18, 19 are provided with flexible end portions 16, 17 to accommodate changes in the positions of the outlets 14, 15 of the chutes. The flexible end portions can incorporate dust covers to dustproof the machine, a preferred feature when dispensing powdered goods.

Two flexible lines, such as thin chains 31, 32 are connected respectively between scale beams 10, 11 and opposite ends of a pivotable directing member such as beam 30. The chains 31, 32 are connected to rigid vertical rods 41, 42 which can incorporate stops (not shown) to limit upward and downward movement of the scale beams. The beams 30 is connected directly to the feeding chute 20 so that rotational movement of the beam 30 about its pivot axis causes the feeding chute 20 to pivot. The beam 30 has a counterweight 35 arranged so that as the beam pivots through a horizontal position, the centre of gravity of the combined beam/counterweight passes from one side of the pivot axis to the other.

Operation of the filling machine will now be described. Initially, it is assumed that the containers on both scale beams are empty. With beam 30 in position 1, the delivery end of the feeding chute 20 will be orientated towards connecting chute 18 so that material passing through the feeding chute 20 will fill the container on scale beam 10. When the container on scale beam 10 is filled to a weight determined by the value and position of weight 22 on the opposite end of that beam, scale beam 11 will tilt so that the container support end drops. The drop in the scale beam 11 is transferred by a chain 31 to beam 30. When the upper end of beam 30 is pulled down by a predetermined distance A, the centre of gravity of the combined beam and counterweight crosses the centre line and thereby causes the beam 30 to continue rotating in that direction to a rest position. In practice, the distance A need only be a short distance as the inertia of the counterweight keeps it moving past the centre line. A short scale beam 30 can therefore be used. The material passing through feeding chute 20 is now directed to the container on scale beam 11.

It is to be noted that a small downward movement of the scale beam 10 is sufficient to cause the counter weight 35 to cross the vertical plane of the chute's pivoting axis, i.e. the plane of equilibrium. In fact, the centre of gravity of the combined beam 30 and counter weight 35 crosses the vertical plane of equilibrium before the scale beam 10 crosses its plane of horizontal equilibrium. This means that once the container on scale beam 10 reaches its predetermined weight, it will trigger the changeover quickly, thereby resulting in increased accuracy in the dispensed weights.

While the container on scale beam 11 is being filled, the filled container on scale beam 10 can be removed and replaced by an empty container. The container end of beam 10 would then rise but this upward movement would not be transferred to beam 30 by chain 31 since it is flexible. The chains 31, 32 only transfer downward movement of the scale beams to beam 30.

When the container on scale beam 11 is filled to the required weight, the filling machine follows a procedure similar to that described above so that the feeding chute 20 is redirected from the connecting chute 19 back to connecting chute 18, and the material passing therethrough commences to fill the empty container on scale beam 10.

It is to be noted that when a scale beam drops under the weight of its container, the scale beam does not have to lift or act against the weight of the other scale beam since it would have returned to the "up" position upon removal or its filled container. This ensures a quick changeover and increased accuracy in the dispensed weights.

The present invention can be used to dispense granular or powdered products such as root crops and fruit, as well as grain, fertilizers, chemicals, sugar, foodstuffs and other such materials. Furthermore, the invention can be adapted to dispense bulk liquids.

The present invention requires no electric power and can be operated "in the field".

Two flexible lines, which can be chains, strings, cords, ropes or cables, provide the linkage between the scale beams and the feeding chute. Consequently, friction and inertia are minimized and the invention can be used to dispense quantities even less than 1 kilogram. Moreover, the flexible lines involve low cost and require little, if any, maintenance. The line linkages can be easily replaced with stronger lines and the filling machine can be adapted to dispense heavy weight quantities over 50 kilograms.

Test conducted on weighing machines constructed in accordance with the described embodiment have shown that 5 kilogram weight can be dispensed with 0.3% accuracy.

The foregoing describes one embodiment of the present invention and modifications, obvious to those skilled in the art, may be made thereto without departing from the scope of the invention as claimed hereafter. For example, to assist in dispensing material of poor flow characteristics, an auger can be incorporated into the machine to force feed the material into the input chute 5, from where it is gravity fed through the chutes into the containers to be filled.

The machine of the present invention can also be incorporated into a conveyor assembly whereby containers are automatically positioned on the supports 21 and removed when filled. The automatic removal can be triggered by the tilting of the respective scale beam.

As a safety measure, springs can be inserted between flexible lines 31, 32 and the beam 30. The springs are of such tension that they are closed during normal operation, but will expand if an excessive load is applied to thereby prevent breakage of the flexible lines..

What I claim is:

1. An apparatus for dispensing predetermined weights of material into containers, said apparatus comprising:
   a pair of pivotable support members, one end of each support member providing a support for a respective container to be filled, the other end of each support member providing a predetermined counterweight to determine the weight of material to be dispensed into said respective container, each said support member being pivotable about an axis between its ends;
   a material feeding chute pivotable about an axis and adapted to dispense material alternately into each said container in such a manner that a material flow, entering said feeding chute impinges on a face of said chute so as to produce no substantial turning moment about the pivot axis of the chute; and means for directing said feeding chute from one container to the other when said one container is filled to the predetermined weight;
   said means for directing said feeding chute having a directing member connected to said chute and pivotable about an axis between its ends, two flexible lines, each connected between a respective one of said support members and a respective end of said directing member, said directing member being counterweighted so that its center of gravity passes from one side of its pivoting axis to the other during pivoting;
   whereby each said flexible line causes said directing member to pivot in response to movement of the corresponding support member in only one direction when the respective container is filled to the predetermined weight to thereby direct said feeding chute to the other container.

2. Apparatus as claimed in claim 1 wherein said counterweighted directing member and flexible lines are constructed so that upon downward movement of said one end of each said pivotable support member, the centre of gravity of the counterweight crosses the vertical plane of its pivoting axis before the respective pivotable support member crosses the horizontal plane of its pivoting axis.

3. Apparatus as claimed in claim 1 wherein said flexible lines comprise lengths of chain.

4. Apparatus as claimed in claim 1 wherein said flexible lines comprise lengths of string.

5. Apparatus as claimed in claim 1 wherein said directing member and said feeding chute pivot about the same axis.

6. Apparatus as claimed in claim 1 wherein the passages for the flow of material from said feeding chute to said containers are dust proofed.

7. Apparatus for dispensing predetermined weights of material into containers, said apparatus comprising:
   a pair of pivotable support members, one end of each support member providing a support for a respective container to be filled, the other end of each support member providing a predetermined counterweight to determine the weight of material to be dispensed into said respective container, each said support member being pivotable about an axis between its ends;
   a material feeding chute pivotable about an axis and adapted to dispense material alternately into each said container in such a manner that a material flow entering said feeding chute impinges on a face of said chute so as to produce no substantial turning moment about the pivot axis of said chute; and
   means for directing said feeding chute from one container to the other when said one container is filled to the predetermined weight;
   whereby said means for directing said feeding chute comprises a counterweighted directing member pivotable about an axis between its ends, two flexible lines, each connected between a respective one of said support members and a respective end of said directing member, said directing member being connected to said feeding chute, whereby each said flexible line causes said directing member to pivot in response to movement of the corresponding support member in only one direction when the respective container is filled to thereby direct said feeding chute to the other container.

* * * * *